May 22, 1956 J. J. GRUBB 2,746,298
SPECIFIC GRAVITY MEASURING APPARATUS
Filed Nov. 13, 1952
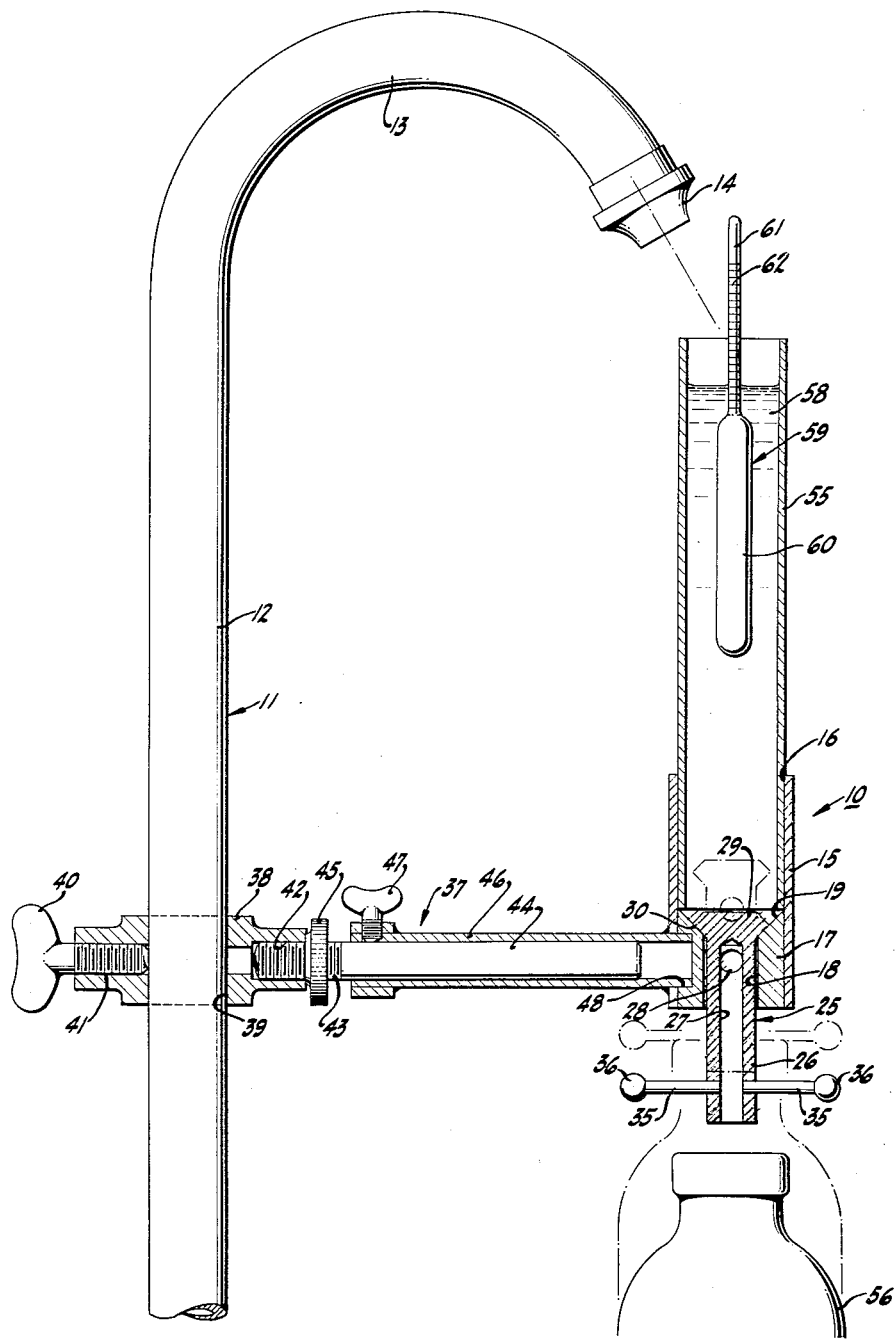
INVENTOR
JOHN J. GRUBB
BY Edward B. Fegg
ATTORNEY United States Patent Office 2,746,298
Patented May 22, 1956

2,746,298

SPECIFIC GRAVITY MEASURING APPARATUS

John J. Grubb, Palo Alto, Calif.

Application November 13, 1952, Serial No. 320,180

2 Claims. (Cl. 73—444)

This invention relates to gravity measuring apparatus for rapidly performing specific gravity determinations of liquids such as urine.

In analytical laboratories where it is necessary to make numerous specific gravity or density determinations on liquids, it is desirable to provide apparatus and a technique whereby such determinations can be carried out with sufficient accuracy yet with great rapidity. Such apparatus should not only lend itself to accurate and rapid operation but it should be relatively simple to set up and take down and it should not be overly expensive or complex.

In some instances, such as urine analysis with a hydrometer, a relatively small sample of liquid is used for each determination and in other instances, such as milk analysis with a lactometer, a relatively large sample of liquid is used. In each case it is desirable to quickly fill and empty the vessel or tube which holds the liquid, and it is also desirable to conduct rapid analyses without likelihood of contact of the liquid with the skin or clothing of the operator.

Heretofore, to my knowledge, apparatus employed for rapid gravity measurements of liquids have suffered from one or more of several defects. Thus some such apparatus does not lend itself to rapid determinations while other apparatus is rather elaborate and expensive, or is difficult to operate or to assemble and disassemble. In instances where large samples of liquid are analyzed, such as milk analysis with lactometers, the speed factor is aggravated. In instances such as the analysis of an unsanitary liquid such as urine, or a corrosive liquid such as highly caustic or acid fluids, the contact factor has been aggravated.

It is an object of the present invention to provide apparatus suited for a specific gravity measurement which is rapid and accurate in its operation.

Yet another object is to provide gravity measuring apparatus which is simple and inexpensive to manufacture and which is easily set up and taken down.

A further object is to provide apparatus of the character described which lends itself to rapid, accurate measurement of specific gravity of liquid and which is simple to set up and to take down.

Another object is to provide apparatus capable of carrying out rapid gravity determinations even with large samples of liquid, and which eliminates or minimizes the likelihood of bodily contact with the liquid which is analyzed.

These and other objects of the invention will be apparent from the ensuing description and the appended claims.

One form of the invention is illustrated by way of example in the accompanying drawings, in which, The single figure is a view partly in side elevation and partly in vertical section of the apparatus of the present invention.

Referring to the single figure, the apparatus is generally designated as 10 and it is shown mounted by the means hereinafter described on a faucet 11. The faucet 11 is of the type generally used in laboratories including a vertical pipe 12, a goose neck 13 and a tip 14.

The apparatus 10 comprises a holder cup or socket 15 in the form of a cylindrical tube which has an open upper end at 16 and which may be constructed of stainless steel or any other suitable material which is resistant to the fluids employed. The lower end of the cup 15 is fitted with a bottom plug 17 having an axial passage 18 which diverges upwardly and outwardly at its upper end to provide a frusto-conical valve seat 19 for a purpose described hereinafter. A valve member 25 is provided having a stem 26 formed with an axial passage 27 and also formed with one or more radial openings 28 near its upper end. At its extreme upper end the valve member 25 is formed with a head or valve 29 which diverges upwardly and outwardly at 30 to mate with and seat on the valve seat 19. At its lower end the valve member 25 is provided with radial arms 35 each having a balled outer end 36.

The cup 15 and the valve member 25 are adjustably mounted on the faucet 11 by the mounting means generally designated as 37. The mounting means 37 comprises a clamp 38 of known construction having an axial passage 39 adapted to slide freely on the vertical pipe 12, and a screw 40 threaded into the clamp at 41. The clamp is tapped at 42 diametrically opposite the screw 40 to receive the threaded end 43 of a rod 44. A lock nut 45 is provided to fix the rod 44 to the clamp 38. A sleeve or tubular rod 46 is provided which slidably receives the rod 44 and which is clamped thereto in adjusted position by means of a set screw 47. At its outer or right-hand end the sleeve 46 is welded or otherwise fixed to the tube 15, preferably extending through the wall thereof and into a socket 48 formed in the bottom plug 17.

Also shown in the drawing is a tube 55 constructed of glass or other suitable transparent material. The tube 55 is open at both ends and is of an outside diameter to fit slidably but snugly within the steel holder tube 15. It will be noted that the lower end of the tube 55 is supported by the walls of the socket 15 and by the bottom plug 17. It will also be noted that the maximum diameter of the valve 29 is less than the inside diameter of the tube 55 to allow the latter to move from its normal, closed position (shown in solid lines) to open position (shown in broken lines). If it is desired to employ the apparatus for volumetric measurement, the tube 55 may be provided with graduations for measuring the volume of liquid in the tube.

In use the apparatus thus described and illustrated is employed as follows:

The clamp 38 is adjusted to the proper height on the faucet 11 and is securely clamped at such height by means of the screw 40. The sleeve 46 is moved inwardly or outwardly, as necessary, to locate the cup 15 at the desired point and it is clamped in adjusted position by means of the set screw 47. Preferably the cup 15 is located beneath and in registry with the tip 14 of the faucet 11. As illustrated a bottle or other receptacle shown at 56 is deposited beneath the valve member 25. When the proper adjustments have been made, a sample of the liquid to be analyzed, e. g., a specimen of urine, is introduced into the tube 55, such liquid being indicated in the drawing by the numeral 58. If a gravity determination is to be made, a suitable gravity measuring instrument such as a hydrometer shown at 59 is placed in the body of liquid. The hydrometer 59 includes the usual bulb 60 having a heavy fluid therein and a stem 61 with graduations 62 thereon for taking a reading.

When a reading has been made, the bottle 56, or a beaker or any other suitable vessel, is raised to encircle the lower end of the valve stem 26 and to contact the radial arms 35, thereby lifting the valve member 25 and with it, of course, the frusto-conical valve 29. The liquid in the tube 55 will flow rapidly through the radial hole or holes 28 into the axial passage 27, thence into the bottle or other receptacle. Alternatively, an operator may simply lift the arms 35 by hand or with a pair of tongs or a glass stirring rod, and allow the liquid content of the tube 55 to drain directly into a sink.

After the liquid in the tube 55 has drained completely, the water tap or faucet 11 will be turned on and water caused to flow down through the tube 55 to flush it out and remove the residue of test liquid. If it is desired to carry out this flushing operation with distilled water or any other wash liquid, such may be done merely by pouring it from a beaker or flask into the upper end of the tube 55. The arms 35 are then released and the valve 25 allowed to drop to its normally closed position in readiness for the next determination.

It will, therefore, be apparent that apparatus has been provided which is adapted to carry out rapid specific gravity or density determinations on liquids. The apparatus is dependable and accurate in its operation, it is easily assembled and disassembled and it is readily adjustable for height and for span from a water tap, rod or other frame member to which it is attached. When a determination has been made and it is desired to empty the apparatus, such is accomplished with a minimum of effort and a maximum of speed. The same means employed to drain the apparatus also adapts it to rapid washing with water or other cleaning fluid. When the draining and washing operations have been completed, release of the valve member automatically operates to restore the apparatus to a state of readiness for the next determination.

Among other advantages of the apparatus of the present invention are the following:

It is adapted for use with small samples of liquid, e. g., in urine analysis, and it is equally adapted for use with large samples of liquid, e. g., in milk analysis. Where large samples of liquid are employed, it may be desirable to increase the height and diameter of the holding cup or socket 15 and of the valve, valve seat, etc. The apparatus eliminates or minimizes the likelihood of contact of the test liquid with the body or clothing of an operator. Thus, it is not necessary to pick up and handle any of the apparatus except the hydrometer.

I claim:

1. Apparatus of the character described comprising a tube holder in the form of a cylindrical socket having an open upper end and a smooth inner wall, a cylindrical glass tube open at both ends and of a diameter to fit slidably within said socket and to seal against the inner wall thereof, a bottom closure for said socket having a valve seat at its upper end and having a longitudinal passage extending therethrough, a valve cooperable with said valve seat to normally close said passage, and a valve operating member in the form of a tubular rod fixed to the undersurface of said valve, extending through said longitudinal passage, and having a lateral opening communicating the interior of said socket with the interior of said tubular rod for draining liquid from said glass tube; said apparatus also comprising mounting means comprising a vertically adjustable clamp attachable to a frame member and extensible cantilever means fixed at one end to said clamp and at the other end to said socket.

2. Apparatus of the character described comprising a socket having a bottom opening for outflow of liquid and a valve normally closing such opening, said valve being movable vertically to open position; a transparent tube seated in and extending upwardly from said socket, said tube being in sealing engagement at its lower end with said socket and being open at its upper end; and vertically and horizontally adjustable support means for clamping said socket and tube to the vertical pipe of a water tap at any desired level and with the tube spaced at any desired distance from the vertical pipe to register with the outlet of the tap.

References Cited in the file of this patent

UNITED STATES PATENTS

| 54,073 | Sewell | Apr. 17, 1866 |
| 1,393,864 | Weitz | Oct. 18, 1921 |
| 1,950,963 | Benton | Mar. 13, 1934 |
| 2,463,922 | Turner | Mar. 8, 1949 |
| 2,601,359 | Berwick | June 24, 1952 |

FOREIGN PATENTS

| 405,623 | France | Nov. 19, 1909 |